United States Patent Office 3,429,936
Patented Feb. 25, 1969

3,429,936
NOVEL POLYALKYL ALCOHOLS
Henry C. Godt, Jr., St. Louis, Mo., assignor to Monsanto Company, St. Louis, Mo., a corporation of Delaware
No Drawing. Filed Oct. 22, 1965, Ser. No. 502,452
U.S. Cl. 260—632
Int. Cl. C07c 31/02
6 Claims

ABSTRACT OF THE DISCLOSURE

Polyalkyl alcohols represented by the structure

wherein R is a hydrocarbon polymer of a lower olefin or mixtures of lower olefins, said polymer having a molecular weight of about 300 to about 3000 and $R_1$ is hydrogen or alkyl.

---

This invention relates to certain new long-chain polyalkyl alcohols and to a process of preparing such polyalkyl alcohols.

In the prior art many lower molecular weight alcohols have been synthesized by such methods as the hydration of alkenes utilizing concentrated sulfuric acid followed by hydrolysis of the resulting alkyl sulfuric acid and the conversion of an alkyl halide to the alcohol through reaction with silver hydroxide. The higher molecular weight alcohols such as lauryl, cetyl and octadecyl have been obtained by the saponification of natural occurring fats. The above alcohol synthesis methods have had application to the formation of lower molecular weight alcohols, that is, a molecular weight under 275, wherein the starting material would be reactive towards alcohol synthesis methods. It is known generally that as the molecular weight of a compound increases, the reactivity of that compound towards further reaction decreases. For example, compounds which are particularly difficult to react are olefin polymers above 300 molecular weight and in general those reactions which occur for lower molecular weight compounds, such as the starting monomer of the olefin polymer or dimers or trimers of the monomer, do not occur for the polymer.

Another problem associated with the reaction of olefin polymers other than lack of reactivity is the tendency, in the presence of other compounds or at certain temperatures or both, to depolymerize into monomer units or multiples of monomer units. The depolymerization of a hydrocarbon polymer of a lower olefin causes a decrease in the original molecular weight of the polymer leaving a polymer which is not of the same molecular weight and not structurally intact in relation to the molecular weight of the polymer before reaction.

It is, therefore, an object of this invention to prepare polyalkyl alcohols from hydrocarbon polymers of a lower olefin. It is a further object of this invention to prepare structurally intact polyalkyl alcohols which are useful intermediates in the formation of plasticizers and fuel and lubricating oil additives. It is a further object of this invention to provide a method to prepare structurally intact polyalkyl alcohols which have essentially the same molecular weight as the hydrocarbon polymer before reaction to produce the alcohol.

Further objects will become apparent from the following description of the invention.

It has now been found that sructurally intact polyalkyl alcohols represented by the structure

R—CH—OH
|
R₁ wherein R is a hydrocarbon polymer of a lower olefin of from about 300 to about 3000 molecular weight and $R_1$ is hydrogen or alkyl can be prepared by the reduction of a long-chain alkyl ketone or aldehyde represented by the structure

wherein R and $R_1$ have their aforedescribed significance. A carbonyl compound, as hereinafter referred to, is defined as including polyalkyl ketones and aldehydes.

The reduction of the carbonyl function can be carried out using hydrogenation systems which reduce the carbonyl function and which also do not adversely effect the hydrocarbon polymer by degradation of the polymer. A hydrogenation system which is particularly effective is a lithium aluminum hydride complex with an electron-donating material such as ethers, e.g., cyclic ethers and aliphatic ethers, and substituted amides, said electron-donating material being present in a concentration of about 2 moles of electron-donating material per atom of aluminum. A reduction procedure utilizing this hydrogenation system comprises mixing the polyalkyl ketone with a lithium aluminum hydride complex for a sufficient time and at a sufficient temperature to effect reduction of the carbonyl function to the polyalkyl alcohol. The lithium aluminum hydride complex can be utilized as a slurry in a diluent system such as an inert hydrocarbon medium, e.g., hexane, heptane or excess aliphatic ether, cyclic ether or substituted amide, and it is preferred to use a slurry of lithium aluminum hydride. The polyalkyl ketone or aldehyde is generally added to the lithium aluminum hydride complex slurry over a period of time so as to maintain the temperature of the slurry below or at the reflux temperature of the diluent system utilized in the reduction procedure. The temperature of the lithium aluminum hydride complex slurry is from about −20° C. to about 70° C., preferably from about 15° C. to about 45° C., during addition of the polyalkyl ketone or aldehyde. The polyalkyl ketone or aldehyde can be added as a solution with a hydrocarbon solvent, such as excess ether, heptane or hexane, and it is preferred to use a solvent due to the high viscosity of the polyalkyl ketone or aldehyde. The mol ratio of lithium aluminum hydride complex to polyalkyl ketone or aldehyde is generally from about 1:1 to about 4:1, preferably from about 1.2:1 to about 2.5:1. After addition of the polyalkyl ketone or aldehyde to the lithium aluminum hydride slurry, the mixture is heated at a temperature of from about 20° C. to about 125° C., preferably from about 25° C. to about 70° C., for a period of time of from about 1 hour to about 6 hours, preferably from about 2 hours to about 4 hours. Any excess lithium aluminum hydride is hydrolyzed by any conventional techniques, such as water, and the polyalkyl ketone is separated from the aqueous layer and salts by techniques such as filtration or water washing, e.g., solvent extraction, followed by removal of the solvent by distillation to yield the polyalkyl alcohols of this invention.

The order of addition that is preferred is the addition of the polyalkyl ketone or aldehyde to the lithium aluminum hydride complex slurry; however, the reduction can be accomplished by adding both components to a reaction zone over a period of time or by adding the lithium aluminum hydride complex slurry, by gradual addition, to the polyalkyl ketone or aldehyde. It is also contemplated within the scope of this invention that pressures above atmospheric pressure can be utilized in the process for the reduction of the carbonyl function. Examples of other hydrogenation systems which are suitable for reduction of the carbonyl function are sodium borohydride and lithium borohydride.

It is also contemplated within the scope of this invention that a pressure system can be utilized as a hydrogenation system to reduce the carbonyl function such as a catalyst and hydrogen at pressures of from about 500 p.s.i. to about 1500 p.s.i. at temperatures of from about 150° C. to about 230° C. for about 2 hours to about 8 hours. A particularly effective catalyst is Raney nickel. Traditional catalysts, such as palladium on carbon and platinum on carbon, which in the prior art have been effective in conjunction with hydrogen in reducing a carbonyl function, fail to produce the novel polyalkyl alcohols of this invention.

The conditions of temperature and time for the reduction of the carbonyl function are selected to prepare structurally intact polyalkyl alcohols. Thus, temperatures in general are maintained below about 300° C. to avoid any thermal decomposition of the polymer portion of the ketone or aldehyde. Reduction at temperatures above about 100° C. are carried out in an inert atmosphere or hydrogen atmosphere to prevent oxidation of the polymer portion of the aldehyde or ketone. The molecular weights of the alcohol are determined by the molecular weight of the polyalkyl ketone or aldehyde used as a starting material for the preparation of the polyalkyl alcohols of this invention.

The intermediate long-chain ketone or aldehyde represented by the structure

wherein R and $R_1$ have their aforedescribed significance, can be prepared by reacting an olefin polymer or olefin copolymer or mixtures thereof having a molecular weight of from about 300 to 3000 with ozone. Preferably, a polymer of a lower olefin, or copolymers of lower olefins, is used, for example, polymers of ethylene, propylene, butylene, isobutylene or mixtures thereof. Copolymers which are also useful are copolymers of lower olefins and diolefins, such as 1,3-butadiene and isoprene. Prior to contacting the olefin polymer with ozone, a short-chain alcohol of from about 1 to 12 carbon atoms, preferably from about 1 to 8 carbon atoms is added to the polymer. The alcohol is usually present in a mole ratio to the olefin polymer of from about 1 to 40 moles of alcohol per mole of polymer, preferably from about 1 to 10 moles of alcohol per mole of polymer. A diluent may be utilized such as a lower hydrocarbon solvent, or a mineral oil or distillate oil can also be utilized singly or in conjunction with a short-chain hydrocarbon solvent. The polymer-alcohol system is contacted with ozone at a rate of 0.50 millimole per minute ozone per mole of polymer, preferably from about 1 millimole per minute ozone per mole of polymer to about 6 millimoles per minute ozone per mole of polymer. The reaction may be conducted at a temperature of from −50° C. to +50° C., preferably from −30° C. to +30° C. The reaction is generally carried out for a length of time sufficient to have the ozone input approximately equal the ozone output.

The ozonized polyolefin can be decomposed to provide a polyalkyl ketone in any of the conventional manners, such as with hydrogen over a rare metal catalyst, or with zinc in glacial acetic acid. After ozonolysis, glacial acetic acid is added to the ozonized polyolefin followed by gradual addition of zinc dust to the mixture. The mixture is then heated to a temperature of from about 40° C. to about 100° C. for a time sufficient to decompose the ozonized olefin. The polyalkyl ketone is recovered by any conventional technique such as solvent extraction followed by distillation of the solvent from the polyalkyl ketone.

The non-limiting examples that follow permit a better appreciation of the preparation of the compounds of this invention.

EXAMPLE 1

In a 1-liter 4-necked r.b. flask equipped with ground glass stirrer and paddle, thermometer, gas inlet tube (for below surface feed) and an off-gas exit tube were placed 200 grams (0.2 mole) polybutene, 985 molecular weight, 9.6 grams anhydrous methyl alcohol (0.3 mole) and 300 cc. of olefin-free hexane. The mixture was set in stirring motion, and when a homogeneous solution results, the temperature is taken to −75° C. with a Dry Ice-acetone bath. Ozone, at a flow rate of 0.855 millimole per minute (predetermined using hexane alone) is introduced. It was completely absorbed for 4 hours, after which time ozone was observed in the off-gas. The reaction vessel turned blue, indicating a saturated ozone solution. Ozone was continued to be introduced until the input rate equaled the output flow in the off-gas. Total reaction time required was 6.5 hours. The resulting ozonized polybutene in hexane was allowed to come to room temperature while flushing out the dissolved ozone with a steam of nitrogen.

EXAMPLE 2

In a 1-liter 4-necked r.b. flask equipped with ground glass stirrer and paddle, thermometer (−50° to +100°), gas inlet tube (for below surface addition) and off-gas exit tube were placed 200 grams of polybutene, 1350 molecular weight (0.15 mole), 250 cc. olefin-free hexane, and 9.6 grams (0.3 mole) anhydrous methyl alcohol. The temperature was taken to −75° C. with a Dry Ice-acetone trap (Dewar flask), and ozone, at a predetermined rate of 0.8 millimole per minute, was introduced. Ozone was completely absorbed for most of the reaction, and more slowly toward the end of the reaction. When the ozone concentration in the off-gas equals ozone input rate, the reaction was stopped (8 hours) and the dissolved excess ozone was purged from the system with nitrogen.

EXAMPLE 3

The hexane-ozonized polybutene mixture, as prepared in Example 1, was stripped of hexane at a reduced pressure, leaving sufficient hexane to maintain an easily stirred solution. To a 4-necked reaction flask equipped with a stirrer was added 200 grams of the polymer and 200 cc. of glacial acetic acid. The temperature was 25° C. and 33 grams (0.5 mole) zinc dust was added in small portions over a period of 30 minutes. The temperature increased to 35° C. (maintained by an ice bath) and then the reaction mixture was heated to 65° C. and maintained at this temperature for 1 hour, to insure complete reaction. The reaction mixture was then filtered while hot by suction to remove zinc acetate and unreacted zinc, and the filter was washed with hexane. The product, in hexane solution, was separated from acetic acid by using a separatory funnel. The hexane was then removed under reduced pressure yielding polybutyl ketone, a viscous, very slightly yellow oil. The polybutyl ketone structure was confirmed by infrared analysis.

EXAMPLE 4

To a 1-liter 4-necked reaction flask equipped with a stirrer, was added 360 grams of a polymer made as in Example 2. The reaction mixture was warmed to room temperature and the hexane was partially removed under reduced pressure. 200 cc. of glacial acetic acid was added, and with vigorous stirring, 33 grams (0.5 mole) zinc dust was added in small portions. An exothermic reaction occurred, which was controlled at 35° C. by use of an ice bath. After all the zinc had been added (45 minutes), the reaction mixture was warmed to 60° C. with a heating mantle and maintained for 1 hour. The reaction mixture was then allowed to cool to room temperature and the contents of the vessel transferred to a 2-liter separatory funnel, and the (bottom) acetic acid layer removed. The remaining product in hexane was placed in a 1-liter 4-necked r.b. flask, and the hexane stripped off under reduced pressure. 200 cc. toluene was added, and with the aid of a Dean-Stark trap, the acetic acid and water remaining in the product were removed. The toluene was then removed under reduced pressure, isolating a very viscous light yellow oil. It was filtered by suction (using a heating lamp) to remove cloudiness yielding the polybutyl ketone.

EXAMPLE 5

The ozonolysis procedure of Example 1 and the ozonized olefin polymer decomposition procedure of Example 3 was used for the preparation of a 339 molecular weight polybutyl ketone from a 339 average molecular weight polybutene. The polybutyl ketone was confirmed by infrared analysis.

EXAMPLE 6

In a 500 cc. 4-necked r.b. flask equiped with stirrer, thermometer, condenser and drying tube, and dropping funnel was placed 3.8 grams lithium aluminum hydride powder (0.1 mole) in 75 cc. of dry ether. 16.3 grams of 339 molecular weight polybutyl ketone (0.05 mole) in 100 cc. ether was added dropwise through the dropping funnel to the stirred slurry of lithium aluminum hydride in ether. Addition required about 1½ hours and the temperature was constant at 25–26° C. After all the ether solution had been added, the mixture was heated to reflux for 2 hours. Refluxing was stopped and the excess lithium aluminum hydride decomposed with water. The solution was filtered to remove insoluble lithium hydroxide and aluminum hydroxide salts. The filtrate was placed in a separatory funnel, and the ether layer was then collected and dried overnight over anhydrous sodium sulfate. The ether solution was filtered, and the ether distilled under reduced pressure, yielding the polybutyl alcohol (molecular weight 341) as a clear yellow oil. The yield was 14.5 grams which is 90% based on the weight of starting material. The infrared spectra confirmed the formaiton of the polybutyl alcohol.

EXAMPLE 7

Into a 500 cc. 4-necked r.b. flask equipped with stirrer, thermometer, condenser, drying tube and dropping funnel was placed 0.75 gram lithium aluminum hydride (0.02 mole) in 75 cc. dry ether, and 5.0 grams of polypropyl ketone (molecular weight 662) (0.009 mole) in 100 cc. of ether was added dropwise through the dropping funnel to the stirred slurry of lithium aluminum hydride in ether. The addition required about 1½ hours, after which the reaction mixture was heated to reflux (35° C.), and maintained for 2 hours. The refluxing was stopped and the excess lithium aluminum hydride is decomposed with water. The solution, containing lithium hydroxide and aluminum hydroxide as precipitates, was filtered to remove these salts, and the ether filtrate was washed three times with 50 cc. of water. The ether layer was collected and dried overnight over sodium sulfate. The ether solution was filtered into a 4-necked flask, and the ether removed under reduced pressure, yielding the polypropyl alcohol (molecular weight 664), an orange viscous oil. The yield was 4.5 grams which was 90% based on the starting material weight of the polypropyl ketone. The infrared spectra confirmed the reduction to the polypropyl alcohol.

EXAMPLE 8

Into a 300 cc. 4-necked r.b. flask equipped with stirrer, thermometer and condenser was placed 0.76 grams (0.02 mole) lithium aluminum hydride powder in 50 cc. ether. Nine grams polybutyl ketone (molecular weight 984) in 75 cc. ether was added dropwise from a separatory funnel over a period of 20 minutes. The temperature increased from 25° C. to 28° C. during addition of the polybutyl ketone, after which time the reaction mixture was heated to reflux (35° C.) and maintained for 2 hours. Water was then added to decompose excess lithium aluminum hydride, and the mixture was then filtered to remove lithium salts. The ether layer was then extracted several times with water and then decolorized with charcoal. After filtering, the very light yellow ether solution was dried over sodium sulfate. The ether was then removed under reduced pressure to isolate the polybutyl alcohol (molecular weight 986). The yield of polybutyl alcohol was 8.0 grams which was 80% by weight of starting material. The polybutyl alcohol was a very viscous yelow oil. The infrared spectra confirmed the complete reduction of carbonyl function, and the appearance of the hydroxyl function.

EXAMPLE 9

Into a 300 cc. 4-necked r.b. flask equipped with stirrer, thermometer, condenser and dropping funnel (all openings protected from moisture by calcium chloride drying tubes) was placed 0.38 grams (.01 mole) lithium aluminum hydride in 50 cc. anhydrous ether. Seven grams (0.0058 mole) polybutyl ketone (molecular weight 1350) in 50 cc. ether was placed in the dropping funnel and added dropwise to the stirred lithium aluminum hydride slurry over a period of about 1 hour. The temperature was 25° C. throughout the addition. After addition was completed, the mixture was heated to gentle reflux (35° C.) and maintained for 2 hours. The excess lithium aluminum hydride was then decomposed with distilled water, and the mixture was then filtered to remove lithium hydroxide and aluminum hydroxide. The ether solution was extracted with two portions of water and dried over anhydrous sodium sulfate. The ether solution was filtered, and the ether was removed under reduced pressure leaving the polybutyl alcohol (molecular weight 1352) in the flask. The polybutyl alcohol was a very viscous yellow oil. The infrared spectra confirmed the formation of the polybutyl alcohol by the hydroxyl peak and no carbonyl band.

The following examples, listed in Table I, for the preparation of the polyalkyl alcohols of this invention were carried out in a 1-liter Hastaloy B autoclave using a polybutyl ketone, a catalyst and hydrogen. In Examples 10 to 14, 250 grams of a polybutyl ketone and 250 grams of the indicated solvent were charged into the autoclave. The weight of polybutyl ketone and solvent of Examples 15 and 16 are designated in Table I.

TABLE I

| Ex. No. | Molecular weight ketone | Solvent | Reaction conditions | | Time hrs. | Catalyst | Product | | |
|---|---|---|---|---|---|---|---|---|---|
| | | | Temp., °C. | Pressure, p.s.i. | | | Percent yield | Name | Molecular weight |
| 10 | 339 | 2-ethylbutanol | 210 | 1,000 | 5 | Raney nickel | 81 | Polybutyl alcohol | 341 |
| 11 | 339 | n-butanol | 150 | 800 | 4 | do | 64 | do | 341 |
| 12 | 1,350 | do | 210 | 1,000 | 5 | do | 71 | do | 1,352 |
| 13 | 975 | Cyclohexane | 210 | 1,000 | 6 | do | 73 | do | 977 |
| 14 | 339 | Butanol | 150 | 800 | 2 | Palladium O | | No reaction | |
| 15 | ¹ 339 | No solvent | 152 | 800 | 6 | Palladium on carbon | | do | |
| 16 | ² 368 | 100 grams ethanol | 100 | 50 | 16 | Platinum on carbon | | do | |

¹ 500 grams.  ² 36.8 grams.

The examples in Table I demonstrate the good yields obtainable with selected hydrogenation systems. It is of particular importance that the high yields of polyalkyl alcohols are obtained with hydrogenation systems which produce polyalkyl alcohols essentially of the same molecular weight as the starting material. The traditional hydrogenation methods, such as hydrogen and a platinum or palladium catalyst fail to reduce the carbonyl function. The structurally intact polyalkyl alcohols of this invention are of particular importance in the area of plastics. The ability of the alcohol function to enter into further reaction gives rise to utility as a plasticizer such as the reaction of a polyalkyl alcohol with phthalic acid or phthalic anhydride to produce a monoester or diester. When a monoester is produced, the remaining acid group can in turn be esterified with a short chain alcohol. Also, the polyalkyl alcohol can be reacted with phosphorusoxychloride, alone or in conjunction with short-chain alcohols or phenol compounds to produce phosphate esters which are valuable plasticizers. In general, the polymer hydrocarbon portion of the alcohol reaction product imparts flexibility to rigid polymers. The polyalkyl alcohols find utility as an intermediate in the formation of lubricating oil, fuel oil and gasoline additives, e.g., the reaction of polyalkyl alcohols with polymers of acrylic acid or methacrylic acid or copolymers thereof to form esters. The polymers can be partially esterified with a polyalkyl alcohol and the remaining acid groups esterified with short-chain alcohols. The advantage of a polyalkyl alcohol for esterification is the high degree of oil solubility imparted to the oil insoluble polyacrylic acid and polymethacrylic acid polymers. The esterified polymers are useful as viscosity index improvers in lubricating oil compositions.

It is of particular importance in the utilization of the polyalkyl alcohols of this invention as intermediates to actually be structurally intact. Thus, if decomposition occurs, physical and chemical properties of products containing the alcohols will vary as the course of decomposition cannot be predicted. Also many properties of these novel alcohols are predicated on their relatively high molecular weight and these molecular weights are not obtainable when decomposition of the polymer hydrocarbon radical accompanies alcohol formation.

While this invention has been described with respect to various specific examples and embodiments, it is understood that the invention is not limited thereto and that it can be variously practiced within the scope of the following claims.

The embodiments of this invention in which an exclusive property or privilege is claimed are defined as follows:

1. A compound represented by the structural formula

wherein R is a hydrocarbon polymer of one or more mono-olefins wherein the mono-olefin is selected from the group consisting of propylene, butylene and isobutylene, $R_1$ is alkyl of from 1 to 6 carbon atoms and R has a molecular weight of about 700 to about 2000.

2. A compound of claim 1 wherein R is a hydrocarbon polymer of a lower mono-olefin consisting essentially of isobutylene.

3. A compound of claim 1 wherein R is a hydrocarbon polymer of a lower mono-olefin consisting essentially of propylene.

4. A compound of claim 1 wherein $R_1$ is methyl.

5. A compound of claim 2 wherein $R_1$ is methyl.

6. A compound of claim 3 wherein $R_1$ is methyl.

References Cited

UNITED STATES PATENTS

| | | |
|---|---|---|
| 2,792,431 | 5/1957 | Niebling et al. |
| 2,819,252 | 1/1958 | Shokal _____ 260—638 |
| 2,824,142 | 2/1958 | Gardner et al. |
| 2,985,617 | 5/1961 | Salyer et al. _____ 260—45.75 |
| 2,989,516 | 6/1961 | Schneider _____ 260—94.8 |
| 3,308,170 | 5/1967 | Pritchett et al. |
| 3,311,598 | 3/1967 | Mertzweiller et al. |
| 3,312,744 | 4/1967 | Farr et al. |
| 3,312,745 | 4/1967 | Habeshaw et al. |
| 2,668,181 | 2/1954 | Banes et al. _____ 260—642 |
| 2,713,071 | 7/1955 | Erchak _____ 260—642 |
| 3,308,173 | 3/1967 | Emrick _____ 260—642 |

OTHER REFERENCES

Henne et al., J. Am. Chem. Soc., vol. 65 (1943), pp. 2183–5.

LEON ZITVER, *Primary Examiner.*

J. E. EVANS, *Assistant Examiner.*

U.S. Cl. X.R.

260—638, 597, 93.7, 475, 963, 964, 947, 80; 252—56

PO-1050
(5/69)

UNITED STATES PATENT OFFICE
CERTIFICATE OF CORRECTION

Patent No. 3,429,936      Dated February 25, 1969

Inventor(s) Henry C. Godt, Jr.

It is certified that error appears in the above-identified patent and that said Letters Patent are hereby corrected as shown below:

Column 1, in the Abstract of the Disclosure, that portion of the formula reading "N" should read -- H --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents